US012652099B2

(12) United States Patent
Tranchet et al.

(10) Patent No.: US 12,652,099 B2
(45) Date of Patent: Jun. 9, 2026

(54) COMMUNICATION DEVICE, COMMUNICATION SYSTEM, AND METHOD FOR COMMUNICATION

(71) Applicants: Airbus Operations GmbH, Hamburg (DE); Airbus Operations (S.A.S.), Toulouse (FR)

(72) Inventors: Francois Tranchet, Toulouse (FR); Timo Warns, Hamburg (DE)

(73) Assignees: Airbus Operations (S.A.S.), Toulouse (FR); Airbus Operations GmbH, Hamburg (DE)

( * ) Notice: Subject to any disclaimer, the term of this patent is extended or adjusted under 35 U.S.C. 154(b) by 418 days.

(21) Appl. No.: 17/897,773

(22) Filed: Aug. 29, 2022

(65) Prior Publication Data
US 2023/0069277 A1 Mar. 2, 2023

(30) Foreign Application Priority Data

Aug. 30, 2021 (EP) ..................................... 21193806

(51) Int. Cl.

| | |
|---|---|
| *H04B 7/185* | (2006.01) |
| *G01C 21/10* | (2006.01) |
| *G08G 5/21* | (2025.01) |
| *G08G 5/26* | (2025.01) |
| *G08G 5/55* | (2025.01) |
| *G08G 5/59* | (2025.01) |

(52) U.S. Cl.
CPC ......... *H04B 7/18506* (2013.01); *G01C 21/10* (2013.01)

(58) Field of Classification Search
CPC .. H04B 7/18506; G01C 21/10; G08G 5/0021; G08G 5/006; G08G 5/0013
See application file for complete search history.

(56) References Cited

U.S. PATENT DOCUMENTS

| | | | | |
|---|---|---|---|---|
| 4,454,510 A | | 6/1984 | Crow | |
| 6,005,513 A | * | 12/1999 | Hardesty | ................. G01S 19/14 |
| | | | | 342/357.34 |
| 9,031,725 B1 | * | 5/2015 | DiEsposti | ............... G01S 19/11 |
| | | | | 701/22 |
| 2018/0238996 A1 | * | 8/2018 | Gurusamy | ............ G01S 13/953 |

FOREIGN PATENT DOCUMENTS

| | | | | |
|---|---|---|---|---|
| CN | 107727093 A | * | 2/2018 | ........... G01S 13/913 |

OTHER PUBLICATIONS

English Translation CN107727093A.*
European Office Action in EP Application No. 21193806.3, dated Sep. 5, 2024, 3 pages.
European Search Report for Application No. 21193806 dated Feb. 9, 2022.

* cited by examiner

*Primary Examiner* — Rachid Bendidi
*Assistant Examiner* — Neit J. Nieves Flores
(74) *Attorney, Agent, or Firm* — KDW Firm PLLC

(57) ABSTRACT
An airborne communication device installed in a vehicle, wherein the airborne communication device is configured to receive navigation information from a ground-based communication device installed outside the vehicle via a datalink protocol. A ground-based communication device, a communication system, and a method for communication are described.

11 Claims, 2 Drawing Sheets

COMMUNICATION DEVICE, COMMUNICATION SYSTEM, AND METHOD FOR COMMUNICATION

CROSS-REFERENCE TO RELATED APPLICATION

This application claims priority to EP Patent Application No. 21193806.3 filed Aug. 30, 2021, the entire disclosure of which is incorporated by reference herein.

TECHNICAL FIELD

The disclosure herein is directed to an airborne communication device, a vehicle, a ground-based communication device, a communication system, a method for communication, and a computer-readable medium.

BACKGROUND

In order to successfully navigate a vehicle, for example an aircraft, from one point to another, the operators of the vehicle, for example the flight crew of the aircraft, need to have access to certain navigation information. One example of navigation information is position-velocity-time (PVT) information, which includes information pertaining to the current position and velocity of the vehicle and the current time.

Vehicles can take benefit from different navigation aids to determine their current position and velocity, as well as the current time, including the Inertial Reference System (IRS), the clock, the Global Navigation Satellite System, the VHF Omnidirectional Range (VOR), and Distance Measuring Equipment (DME). If these navigation aids are not available, e.g. due to technical error or adverse external conditions, or if the operators are concerned by the integrity of the computed PVT information, the operators can contact outside sources, for example an air traffic controller, via voice communication to request PVT information, such as radar vectors providing position information. The operators can then use this information to support navigation and to cross-check the integrity of PVT solutions determined on-board.

Furthermore, there are datalink solutions that allow an outside source, for example an air navigation service provider, to establish a contract with the aircraft, requesting that the vehicle contacts the outside source and transmits its position and velocity information on specific triggers. The outside source then uses this information to support the air traffic management of all vehicles in a region.

In view of the above, it would be beneficial if a way for outside sources to support the navigation of vehicles could be provided which does not require a lot of manual workload of either the operators of a vehicle or personnel associated with the outside source.

SUMMARY

According to the disclosure herein, the above problem is solved by an airborne communication device, a vehicle, a ground-based communication device, a communication system, a method, and a computer-readable medium with features disclosed herein.

In a first aspect of the disclosure herein, an airborne communication device, which is installed in a vehicle, is configured to receive navigation information from a ground-based communication device installed outside the vehicle via a datalink protocol.

In a second aspect of the disclosure herein, a vehicle, in particular an aircraft or a spacecraft, comprises an airborne communication device according to the first aspect of the disclosure herein.

In a third aspect of the disclosure herein, a ground-based communication device, which is installed outside a vehicle, is configured to transmit navigation information to an airborne communication device according to the first aspect of the disclosure herein.

In a fourth aspect of the disclosure herein, a communication system comprises an airborne communication device according to the first aspect of the disclosure herein and a ground-based communication device according to the third aspect of the disclosure herein.

In a fifth aspect of the disclosure herein, a method for communication comprises a step of transmitting navigation information via a datalink protocol by a ground-based communication device installed outside a vehicle, and a step of receiving the navigation information via the datalink protocol by an airborne communication device installed in the vehicle.

In a sixth aspect of the disclosure herein, a computer-readable medium comprises instructions which, when executed by a communication device, perform the method according to the fifth aspect of the disclosure herein.

A central idea of the disclosure herein is to provide a system in which navigation information can be transferred to a vehicle in a way that does not necessitate explicit, elaborate action by an operator of the vehicle. Furthermore the navigation information is transmitted via a datalink protocol, which means it is transmitted in a digital format that allows for easy further processing compared to e.g. receiving the navigation information via voice communication.

In that way, it is possible to significantly reduce the workload of vehicle operators and auxiliary personnel outside the vehicle.

Advantageous embodiments and improvements of the basic idea of the disclosure herein are disclosed herein.

According to an embodiment of the airborne communication device the navigation information comprises position-velocity-time-information for the vehicle.

Position-velocity-time-information allows a vehicle to navigate with sufficient performance, meaning that this way navigation information can be delivered in an advantageously efficient manner.

According to a further embodiment of the airborne communication device, the airborne communication device is configured to provide the received navigation information to another device installed in the vehicle. In particular, the airborne communication device is configured to notify an operator of the vehicle if there is a discrepancy between the received navigation information and other available navigation information.

According to a further embodiment of the method, the method further comprises a step of providing the navigation information received by the airborne communication device to another device installed in the vehicle.

This way, the usage of the received navigation information can advantageously be extended to other objectives including, but not limited to, removing doubts about the position of the vehicle in abnormal conditions.

According to a further embodiment of the airborne communication device, the airborne communication device is configured to request the navigation information from the ground-based communication device.

According to a further embodiment of the method, the method further comprises a step of requesting the transmittal of the navigation information by the airborne communication device.

This way, the receiving of navigation information can be assured if necessary, without putting extraneous additional workload on the ground-based communication device.

According to a further embodiment of the airborne communication device, the airborne communication device is configured to request the navigation information in specific events.

According to a further embodiment of the method, the step of requesting the navigation information is performed in specific events.

The specific events can in particular be that other navigation information becomes unavailable or that a discrepancy in other navigation information is detected.

This way, the transmittal of navigation information can be automated, further reducing the workload on operators of the vehicle. Furthermore, the resilience of the navigation of the vehicle under adverse conditions can be advantageously increased.

According to a further embodiment of the airborne communication device, the airborne communication device is configured to establish a contract with the ground-based communication device to receive navigation information in specific events.

According to a further embodiment of the method, the method further comprises a step of establishing a contract with the ground-based communication device to transmit the navigation information in certain events.

The specific events can in particular be a predetermined frequency, that the ground-based communication device detects that the vehicle enters or leaves a certain area, or that the ground-based communication device detects that the vehicle does not enter or leave a certain area within a specified time frame.

This way, in case many vehicles are in need of receiving navigation information from the ground-based communication device, the transmittal of the navigation information can be managed with advantageously increased efficiency.

The embodiments and improvements above can be combined in any reasonable way. Further embodiments, improvements, and implementations of the disclosure herein further comprise combinations of previously or subsequently mentioned features of the disclosure herein even if the combinations have not been explicitly mentioned. In particular, a person skilled in the art will add single features to the respective base aspects of the disclosure herein.

BRIEF DESCRIPTION OF THE DRAWINGS

The disclosure herein will subsequently be explained in more detail by the embodiments shown in the schematic drawings.

DETAILED DESCRIPTION

The drawings shown here are meant to impart an extended understanding of the embodiments of the disclosure herein.

They illustrate embodiments and serve in conjunction with the description to explain principles and concepts of the disclosure herein. Further embodiments and a number of the stated advantages are revealed in view of the drawings. The features of the drawings are not necessarily shown to scale.

In the figures identical and functionally identical features are—unless noted otherwise—designated with the same reference numbers.

Figure 1:
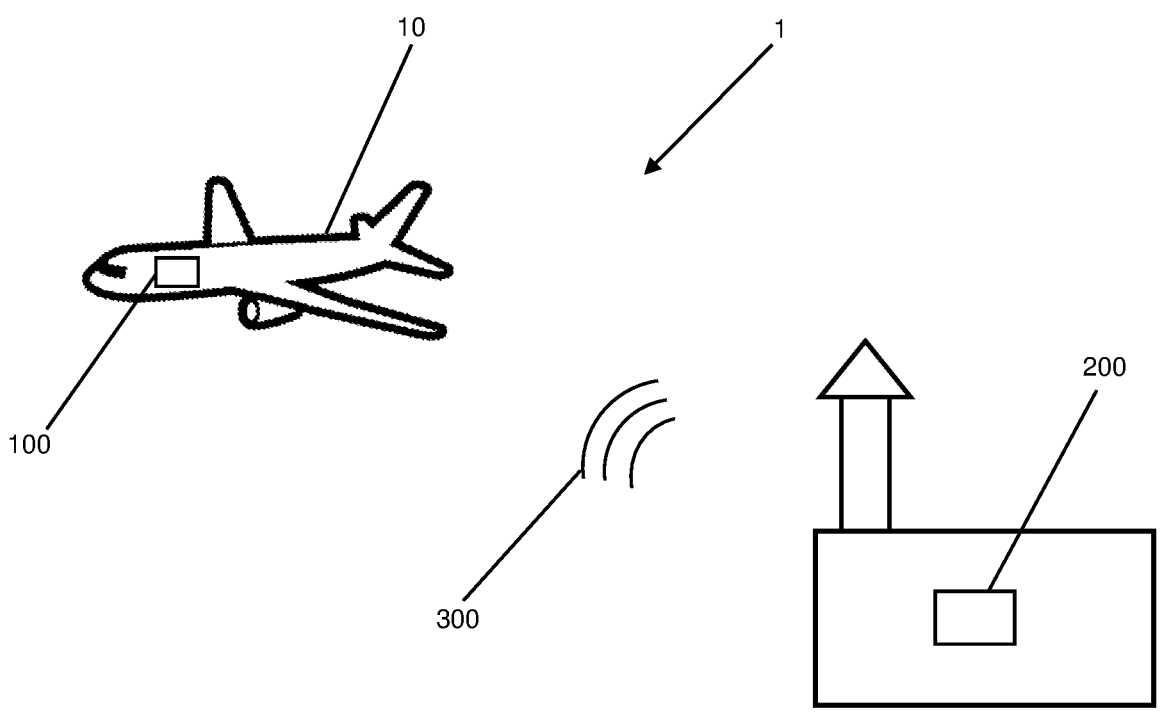
FIG. 1 shows a schematic illustration of a communication system according to an embodiment of the disclosure herein.

FIG. 1 shows an embodiment of a communication system 1 according to an aspect of the disclosure herein. The communication system comprises an airborne communication device 100, which is installed in a vehicle 10, here shown as an aircraft. The communication system 1 further comprises a ground-based communication device 200, which is installed outside the vehicle 10, here shown installed in an air traffic control complex. Navigation information 300 is transmitted from the ground-based communication device 200 to the airborne communication device 100.

With the shown communication system 1, a vehicle can receive navigation information from an outside source, the ground-based communication device, without an operator of the vehicle having to manually contact an outside source, for example via voice communication.

FIG. 1 does not show when or why the ground-based communication device 200 transmits the navigation information 300 to the airborne communication device 100. It is possible that the decision on when to do so rests solely with the ground-based communication device 200. It can be advantageous to allow the airborne communication device 100 to request the transmittal of the navigation information 300, as the decision on whether the transmission is necessary or beneficial or not can be made with better accuracy from the vehicle 10 than from outside it.

It is possible to allow an operator of the vehicle 10 to manually cause the airborne communication device 100 to request the transmission of the navigation information 300. This gives the operator of the vehicle 10 control over the transmission of the navigation information 300, while still providing an advantageously reduced workload for the operator compared to e.g. requesting the information via voice communication.

Alternatively or additionally, the airborne communication device 100 can be configured to request the navigation information in specific events. Such events can include, but are not limited to, in which other navigation information becomes unavailable or in which a discrepancy in other navigation information is detected.

A different possibility is to configure the airborne communication device 100 in such a way that it can establish a contract with the ground-based communication device 200 to receive navigation information 300 in specific events. This transmission can take place with a predetermined frequency, when the ground-based communication device detects that the vehicle enters or leaves a certain area, or when the ground-based communication device detects that the vehicle does not enter or leave a certain area within a specified time frame.

In the two examples above, the increased automation can further reduce the workload for both operators of the vehicle 10 and auxiliary personnel outside the vehicle 10.

Figure 2:
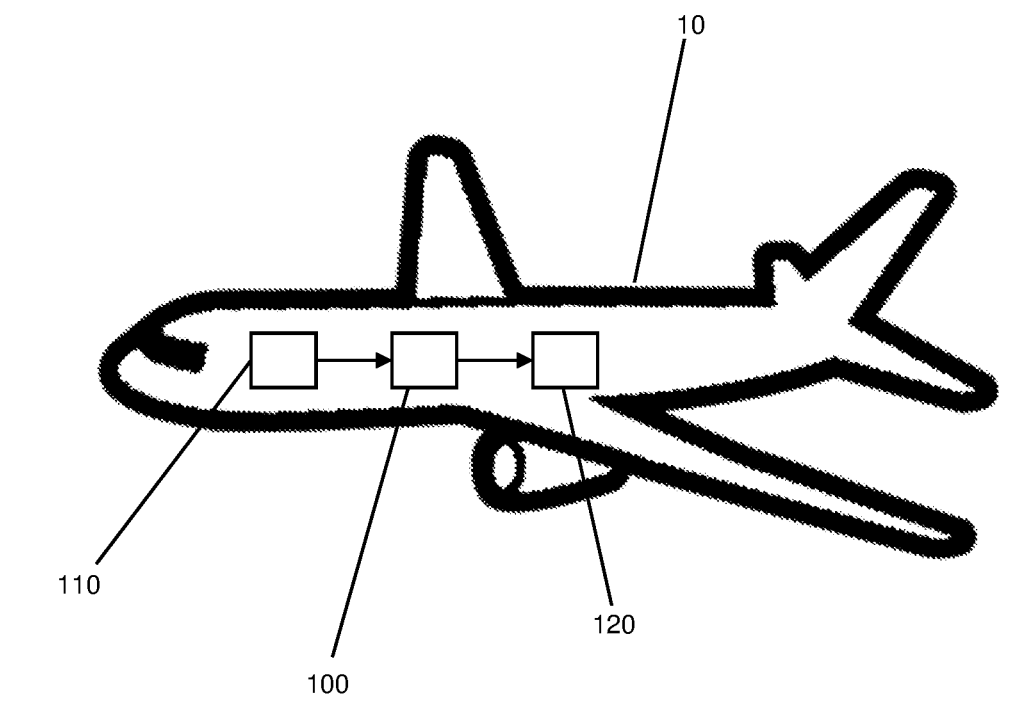
FIG. 2 shows a schematic illustration of a vehicle according to an embodiment of the disclosure herein.

FIG. 2 shows an embodiment of a vehicle 10, in this case an aircraft, which comprises an airborne communication device 100 and two other devices 110, 120, in the present case a navigation device 110 and a notification device 120.

In this embodiment, further communication between the airborne communication device 100 and the other devices 110, 120, can allow further functionalities.

For example, the navigation device 110 can provide further navigation information to the airborne communication device 100. The airborne communication device 100 can then compare this navigation information with navigation information received from a ground-based communication device, and if there is a discrepancy between the two sets of navigation information can then cause the notification device 120 to notify an operator of this existing discrepancy.

This is only one example of how navigation information received via a datalink protocol can be utilized with advantage. Other advantageous usages for the navigation information comprising all manner of computational devices are also possible.

Figure 3:
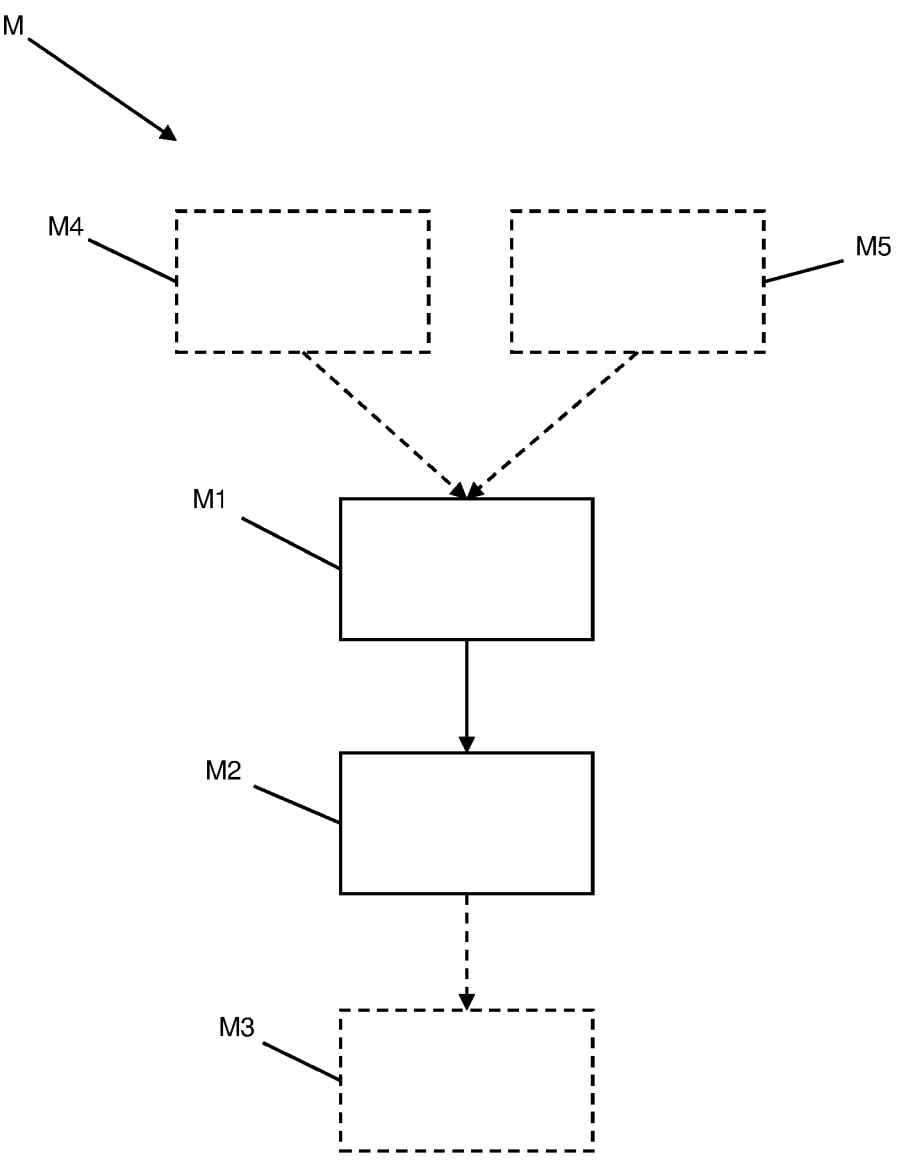
FIG. 3 shows a schematic flow diagram of a method for communication according to an embodiment of the disclosure herein.

FIG. 3 shows a flow diagram of an embodiment of a method for communication, wherein optional method steps are illustrated with dashed lines. In one method step M1 navigation information is transmitted via a datalink protocol by a ground-based communication device installed outside a vehicle. In a further method step M2 the navigation information is received via the datalink protocol by an airborne communication device installed in the vehicle.

In an optional method step M3 the navigation information received by the airborne communication device is provided to another device installed in the vehicle. In a further optional method step M4 the transmittal of the navigation information is requested by the airborne communication device. In a further optional method step M5 a contract with the ground-based communication device to transmit the navigation information in certain events is established.

Throughout this application, the terms "airborne" and "ground-based" have been used to differentiate between the communication device installed in the vehicle and the communication device installed outside the vehicle. This was done as the focus of this application is in the field of aviation and in that field the terms "airborne" and "ground-based" are well known and easy to understand. However, the disclosure herein can also be utilized with ground-based or water-based vehicles. In this context, the terms "airborne communication device" and "ground-based communication device" should be understood as solely more descriptive alternatives to the terms "first communication device" and "second communication device".

The disclosure herein comprises transmission of navigation information via a datalink protocol. The datalink protocol may rely on established datalink communication channels, incl. but not limited to VHF/HF Data Link, satellite communication, LDACS or AeroMACS. Moreover, the datalink protocol may build upon on an established datalink protocol between the vehicle and the ground-based communication device (e.g. ATN Dialog Service) or may be defined as a dedicated application protocol (e.g. as an ATN/IPS IP native application or relying on SWIM infrastructure).

The subject matter disclosed herein can be implemented in or with software in combination with hardware and/or firmware. For example, the subject matter described herein can be implemented in or with software executed by a processor or processing unit. In one example implementation, the subject matter described herein can be implemented using a computer readable medium having stored thereon computer executable instructions that when executed by a processor of a computer control the computer to perform steps. Example computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

1 communication system
10 vehicle
100 airborne communication device
110 device; navigation device
120 device; notification device
200 ground-based communication device
300 navigation information
M method for communication
M1 step of transmitting navigation information
M2 step of receiving navigation information
M3 step of providing navigation information
M4 step of requesting transmission
M5 step of establishing contract

The invention claimed is:

1. An airborne communication device installed in a vehicle, wherein the airborne communication device comprises:

a processing circuit and a transceiver;

wherein, responsive to a determination that navigation information onboard the vehicle is unavailable or to a determination that a discrepancy in the navigation information is detected, the processing circuit is configured to:

establish, with a ground-based communication device installed outside the vehicle, a datalink communication channel selected from the group consisting of:
a very high frequency or high frequency data link;
a satellite communication channel;
an L-band Digital Aeronautical Communications System (LDACS) communication channel; and
an Aeronautical Mobile Airport Communications System (AeroMACS) datalink;

send, over the datalink communication channel using the transceiver, a request to the ground-based communication device for digital navigation information; and wherein responsive to a determination, by the ground-based communication device, that the vehicle has entered or left a specified area, the ground-based communication device is configured to send the digital navigation information to the airborne communication device which is configured to receive, over the datalink communication channel using the transceiver, the digital navigation information via a datalink protocol, the digital navigation information comprising position-velocity-time-information for the vehicle.

2. The airborne communication device according to claim 1, wherein the airborne communication device is configured to provide the received digital navigation information to another device installed in the vehicle, and is configured to notify an operator of the vehicle if there is a discrepancy between the received digital navigation information and other available navigation information.

3. The airborne communication device according to claim 1, wherein the vehicle includes a separate navigation device onboard comprising a processing circuit and configured to provide separate navigation information to the airborne communication device;

wherein the airborne communication device is configured to compare the separate navigation information to the digital navigation information; and wherein the airborne communication device is configured to cause a notification device, comprising a processing circuit, to output a notification in response to a discrepancy being determined between the separate navigation information and the digital navigation information.

4. The airborne communication device according to claim 1, wherein responsive to a determination, by the ground-based communication device, that the vehicle has not entered or left the specified area within a specified timeframe, the ground-based communication device is configured to send the digital navigation information to the airborne communication device via the datalink protocol.

5. A vehicle, aircraft or spacecraft comprising the airborne communication device according to claim 1.

6. A ground-based communication device comprising a processing circuit and a transceiver, installed outside a vehicle, and configured to transmit digital navigation information to the airborne communication device according to claim 1.

7. A communication system comprising an airborne communication device installed in a vehicle, wherein the airborne communication device is configured to receive digital navigation information from the ground-based communication device according to claim 6 via the datalink protocol.

8. A method for communication comprising:

responsive to a determination that navigation information onboard a vehicle is unavailable or to a determination that a discrepancy in the navigation information is detected, establishing a datalink communication channel between an airborne communication device and a ground-based communication device, the datalink communication channel being selected from the group consisting of:

a very high frequency or high frequency data link;

a satellite communication channel;

an L-band Digital Aeronautical Communications System (LDACS) communication channel; and an Aeronautical Mobile Airport Communications System (AeroMACS) datalink;

sending, over the datalink communication channel, a request to the ground-based communication device for digital navigation information;

responsive to a determination, by the ground-based communication device, that the vehicle has entered or left a specified area, the method includes the ground-based communication device transmitting, over the datalink communication channel, the digital navigation information via a datalink protocol, the digital navigation information comprising position-velocity-time-information for the vehicle; and receiving, over the datalink communication channel, the digital navigation information via the datalink protocol by the airborne communication device installed in the vehicle, the airborne communication device using a transceiver to receive the digital navigation information.

9. The method according to claim 8, comprising providing the digital navigation information received by the airborne communication device to another device installed in the vehicle.

10. The method according to claim 8, wherein, responsive to a determination, by the ground-based communication device, that the vehicle has not entered or left a specified area within a specified timeframe, the method further includes the ground-based communication device sending the digital navigation information to the airborne communication device via the datalink protocol.

11. A first non-transitory computer-readable medium comprising instructions which when executed by a first computing device causes the first computing device to perform operations of the ground-based communication device of the method according to claim 8; and a second non-transitory computer-readable medium comprising instructions which when executed by a second computing device causes the second computing device to perform operations of the airborne communication device of the method according to claim 10;

wherein the first computing device and the second computing device each comprise processing circuitry and a transceiver.

* * * * *